(12) United States Patent
Puttagunta et al.

(10) Patent No.: US 10,366,289 B2
(45) Date of Patent: Jul. 30, 2019

(54) SYSTEMS AND METHODS FOR PROVIDING VEHICLE COGNITION

(71) Applicant: Solfice Research, Inc., San Francisco, CA (US)

(72) Inventors: Shanmukha Sravan Puttagunta, Berkeley, CA (US); Fabien Chraim, Berkeley, CA (US); Scott Harvey, San Francisco, CA (US)

(73) Assignee: Solfice Research, Inc., San Francisco, CA (US)

( * ) Notice: Subject to any disclaimer, the term of this patent is extended or adjusted under 35 U.S.C. 154(b) by 0 days.

(21) Appl. No.: 15/460,120

(22) Filed: Mar. 15, 2017

(65) Prior Publication Data

US 2017/0270361 A1    Sep. 21, 2017

Related U.S. Application Data

(60) Provisional application No. 62/308,798, filed on Mar. 15, 2016.

(51) Int. Cl.
*G06K 9/00* (2006.01)
*G06T 19/00* (2011.01)
(Continued)

(52) U.S. Cl.
CPC ......... *G06K 9/00664* (2013.01); *B60W 30/00* (2013.01); *G01C 21/20* (2013.01);
(Continued)

(58) Field of Classification Search
None
See application file for complete search history.

(56) References Cited

U.S. PATENT DOCUMENTS 5,636,123 A    6/1997 Rich et al.
2009/0228204 A1    9/2009 Zavoli et al.
(Continued)

FOREIGN PATENT DOCUMENTS

WO    2015164910 A1    11/2015

OTHER PUBLICATIONS

Schops "3D Modeling on the Go: Interactive 3D Reconstruction of Large-Scale Scenes on Mobile Devices", IEEE, 2015, pp. 291-299.*
(Continued)

*Primary Examiner* — Wei Wen Yang
(74) *Attorney, Agent, or Firm* — Brad Bertoglio; Intelink Law Group, PC

(57) ABSTRACT

Systems and methods for providing vehicle cognition through localization and semantic mapping are provided. Localization may involve in vehicle calculation of voxel signatures, such as by hashing weighted voxel data (S900, S910) obtained from a machine vision system (110), and comparison of calculated signatures to cached data within a signature localization table (630) containing previously known voxel signatures and associated geospatial positions. Signature localization tables (630) may be developed by swarms of agents (1000) calculating signatures while traversing an environment and reporting calculated signatures and associated geospatial positions to a central server (1240). Once vehicles are localized, they may engage in semantic mapping. A swarm of vehicles (1400, 1402) may characterize assets encountered while traversing a local environment. Asset characterizations may be compared to known assets within the locally cached semantic map. Differences of omission and commission between observed assets and asset characterizations with the local map cache (1860) may be reported to a central server (1800). Updates to the local signature cache (1852) and/or local map cache (1862) may be transmitted from the central server (1800) back down to vehicles within the swarm (1840).

7 Claims, 13 Drawing Sheets

(51) Int. Cl.
  *G05B 15/02*  (2006.01)
  *G01C 21/20*  (2006.01)
  *B60W 30/00*  (2006.01)
  *G05D 1/02*  (2006.01)

(52) U.S. Cl.
  CPC ............ *G05B 15/02* (2013.01); *G05D 1/021* (2013.01); *G06K 9/00791* (2013.01); *G06K 9/00818* (2013.01); *G06T 19/003* (2013.01)

(56) References Cited

U.S. PATENT DOCUMENTS

| | | |
|---|---|---|
| 2015/0134584 A1 | 5/2015 | Nakagawa |
| 2015/0228077 A1 | 8/2015 | Menashe et al. |
| 2016/0110433 A1* | 4/2016 | Sawhney ............ G06F 17/2785 707/722 |
| 2016/0290805 A1* | 10/2016 | Irish .................... G01C 21/005 |

OTHER PUBLICATIONS

Kahler "Hierarchical Voxel Block Hashing for Efficient Integration of Depth Images", IEEE, 2016, pp. 192-197.*
PCT International Search Report in PCT/US17/22598, titled "Systems and Method for Providing Vehicle Cognition", Applicant Solfice Research, Inc., filed Mar. 15, 2017.

* cited by examiner

SYSTEMS AND METHODS FOR PROVIDING VEHICLE COGNITION

TECHNICAL FIELD

The present disclosure relates in general to the operation of autonomous robots, and in particular to the creation of localization maps and three-dimensional semantic maps through machine vision systems.

BACKGROUND

Achieving autonomy in robotics has been a continuing objective, and an ongoing topic in research and development for decades. The implications of successful implementations are often far reaching. This is the case in mobility, where both people, goods and vehicles need to be moved safely, efficiently and quickly. For mobile autonomous robots to become a reality, they need to perceive the world around them, in order to operate.

Recent advancements in machine vision technology has brought autonomy closer to realization. Cameras, LiDAR and RADAR (among others) provide the robots with very rich data from their surroundings. This however comes with challenges. The volume of data collected by these real-time systems quickly becomes a burden on the limited memory and computational resources on board. Processing all of the acquired data as it is being generated, to enable the robot to act in its environment, becomes expensive and burdensome.

Pre-made maps of the infrastructure in the environment where the robot or vehicle is traveling can be useful to alleviate the real-time requirements of these systems. In addition, maps can help the robot anticipate the oncoming infrastructure to better plan its routes.

One application of mobile autonomous robots is roadway travel, where vehicles carry people and goods on road networks. Similarly, autonomous trains travel along railway infrastructure. Aerial vehicles, large or small, can also take advantage of autonomy. In these applications and many more, it may be desirable for such vehicles to operate on massive continental scales, meaning that they would travel continuously along the infrastructure over long distances, without requiring human intervention.

While creating a 3D semantic map of a test track for research purposes in autonomy is a rather well-understood practice in surveying, creating these maps for large areas remains a challenge. Use of traditional methods of surveying and digitizing thousands of kilometers of road or rail infrastructure is costly, time-consuming and operationally complex. This is due to factors such as the high levels of accuracy required in the resulting maps, the number of assets to be noted in the environment, and the size of the data used to generate these maps. In addition, with constant changes in the environment, certain areas need to be remapped, which adds to the complexity of the problem.

SUMMARY

In accordance with one aspect disclosed herein, a swarm approach to creating and updating 3D semantic maps is provided. Embodiments can be utilized at continental scales and with high frequency. The swarm can be composed of existing autonomous and semi-autonomous vehicles traveling along the infrastructure to be mapped. The system may utilize a cloud based backend system for aggregation and coordination of collected data, and updating of cached data stored on vehicles during runtime operation.

One aspect of the embodiments is a precise in-vehicle localization engine using signatures (e.g. hashes) derived from spatial data obtained using the machine sensor data.

Another aspect of certain embodiments is an in-vehicle 3D semantic map creation and auditing system, which also uses the vision sensors and leverages the precise positioning component. Vehicles may characterize assets encountered while traversing an environment, and compare those characterizations to semantic map data stored within a local map cache. Differences of omission and commission may be reported to a central server, for evaluation in maintaining a master semantic map. Updates from the master semantic map may be transmitted down to swarm vehicles for use during runtime operation.

Another aspect of certain embodiments is an in-vehicle cognition engine, which interfaces between the localization and mapping engines, and the decision engine, to provide the latter with real-time context from the vehicle's surrounding, depending upon its position and orientation.

These and other aspects are described in detail hereinbelow.

DETAILED DESCRIPTION OF THE DRAWINGS

Figure 1:
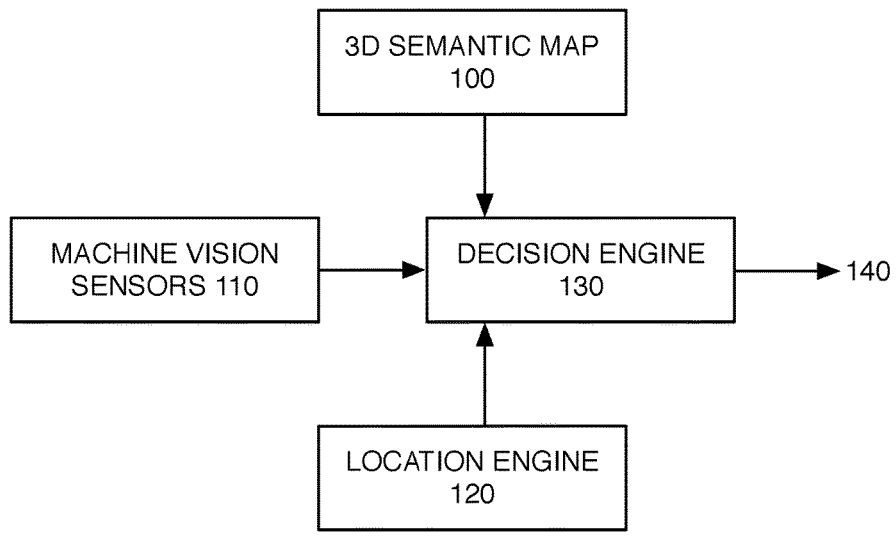
FIG. 1 is a schematic block diagram of a prior art autonomous or semi-autonomous vehicle navigation system.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

FIG. 1 shows conventional system components enabling autonomous operation of robots. A 3D semantic map 100 contains the location of pseudo-static assets, their features, and the semantics relating them to each other. Assets are considered pseudo-static when they are expected to change infrequently, such as on a daily, weekly, quarterly, etc. basis. In the context of autonomous road vehicles, these assets include the features on the road determining the allowed and recommended flow of traffic, as designed by the road engineers. The semantics describe the relationships between the various objects on the road (e.g. the association between a traffic signal and the relevant lanes on a road that are governed by it). In addition to map 100, a set of machine vision sensors 110 provides information in real time concerning the environment surrounding the robot. Machine vision sensors 110 may include LiDAR, RADAR, cameras of varying frequency ranges, etc. Information from sensors 110 may describe both pseudo-static objects, as well as dynamic ones. In the context of a road vehicle, the dynamic objects can be objects that are moving or regularly changing location, such as other cars on the road, pedestrians, cyclists, etc.

Location engine 120 provides a location of the autonomous vehicle on a map, or in an absolute frame of reference (such as a global frame of reference), preferably with levels of precision readily measured in centimeters. Different applications require different levels of precision. For roadway travel, a localization precision below 10 cm may be desirable for safe operation with other potentially non-autonomous vehicles. Three-dimensional semantic map 100, machine vision sensors 110, and location engine 120 all interface with decision engine 130. Decision engine 130 is responsible for actuation of the vehicle (e.g. steering, acceleration and deceleration) by outputting control signals 140 to onboard systems responsible for various aspects of vehicle operation, such as an electric drive motor, a braking system and a power steering system. The objective of decision engine 130 is typically to plan and execute the robot's routes between source and destination, in a safe manner.

Figure 2:
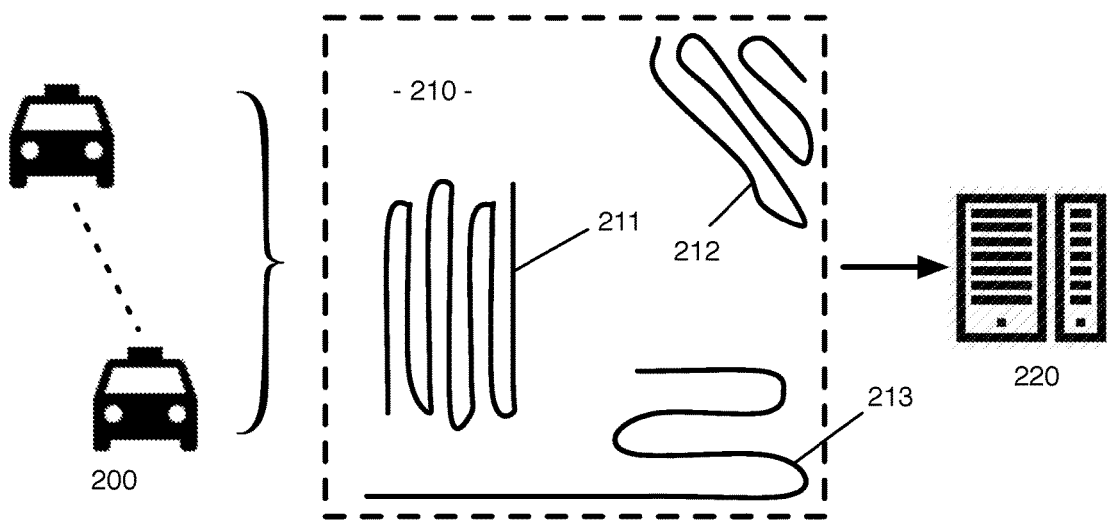
FIG. 2 is a schematic diagram of a prior art system for mapping areas using survey vehicles.

FIG. 2 is a schematic diagram illustrating a conventional approach to creating 3D semantic maps for autonomous cars. This example can be generalized to other applications and industries employing similar methodologies. In the conventional approach, a fleet of survey-grade vehicles 200 is utilized to traverse an area of interest 210 collecting machine vision data. Vehicles 200 traverse planned routes 211, 212 and 213 in order to collect data from predetermined, desired pathways within area 210. The collected data is then moved to data center 220 for storage and management. A semi-automated process is then employed to create the maps from the sensor data.

The conventional approach illustrated in FIG. 2 suffers from several disadvantages. The survey-grade vehicles necessary for the collection of data in this model are costly, typically limiting the size of the fleet to hundreds of vehicles in the best of cases. The United States alone is estimated to have around six million kilometers of roads. Surveying this network with a limited number of vehicles therefore becomes challenging. Routes for each vehicle need to be planned in advance and executed correctly for the data to be useful. Since the environment is constantly changing on roadways (and other transportation facilities), it becomes necessary to revisit the same area multiple times per annual quarter for the maps to be reasonably up-to-date. In addition, survey-grade vehicles 200 typically carry very little computation capability on-board, forcing the operators to transport collected data to data centers 220. This is also challenging, since vehicles 220 may collect on the order of 10 GB of data for every kilometer surveyed. Finally, the semi-automated map making process involves human annotation of data and is error-prone.

Figure 3:
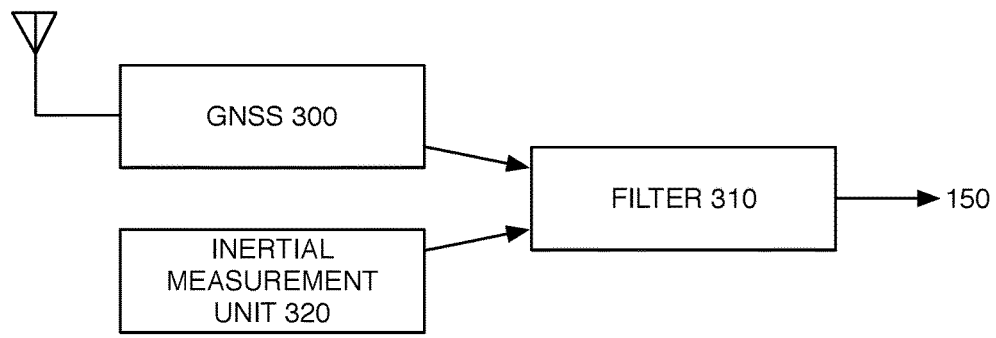
FIG. 3 is a schematic block diagram of a prior art vehicle localization system.

FIG. 3 is a block diagram representation of a commonly used system for localizing vehicles in a geo-referenced manner. A Global Navigation Satellite System (GNSS) receiver 300 receives satellite signals and presents a location estimate to the filtering component 310. An Inertial Measurement Unit 320 tracks the motion of the robot at an elevated rate. (Additionally or alternatively, attitude and heading reference systems (AHRS) may also be employed.) IMU 320 may have multiple sensors (such as accelerometers, gyroscopes, magnetometers, barometric pressure sensors, etc) in order to accurately sense motion of the vehicle. Filter 310 employs sensor fusion to derive a refined estimate of the vehicle position from data received via GNSS 300 and IMU 320. In some embodiments, it may be desirable for filter component 310 to include a microprocessor applying an extended Kalman filter or a particle filter to data received from GNSS 300 and IMU 320.

Figure 4:
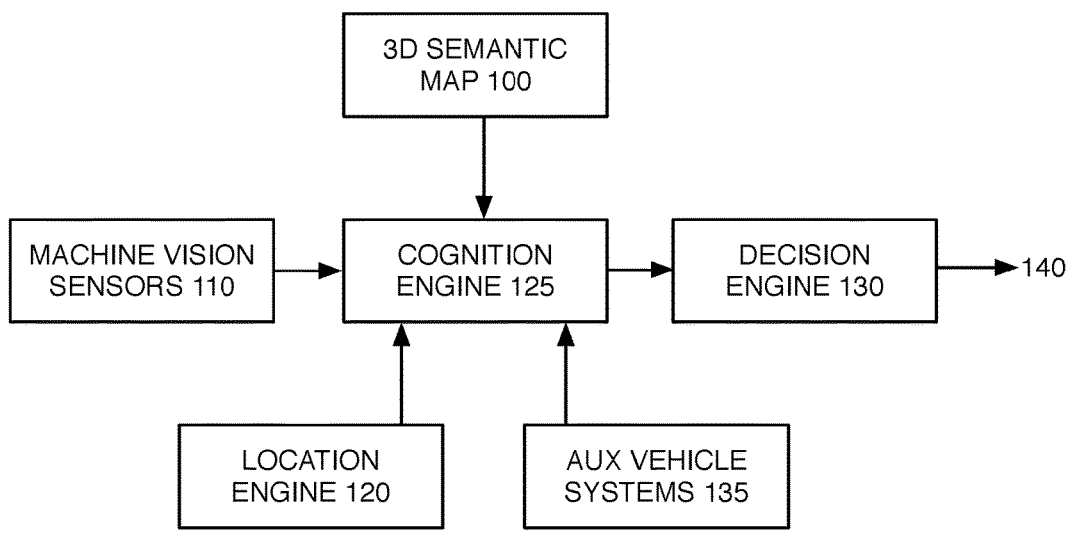
FIG. 4 is a schematic block diagram of a vehicle navigation system.

While the localization system of FIG. 3 may provide a level of accuracy and reliability that is sufficient for some applications, other applications may benefit from a high level of accuracy and precision in localizing a vehicle, such that conventional localization systems having sufficient levels of precision may be unavailable or prohibitively expensive. Therefore, it may be desirable to implement other approaches to vehicle localization, and utilization of such localization for, e.g., precision mapping and/or autonomous vehicle operation. To that end, FIG. 4 illustrates another embodiment of a system enabling autonomous operation of robots. 3D semantic map 100, machine vision sensors 110, location engine 120 each interface with a central cognition engine 125. Cognition engine 125 communicates vehicle context to decision engine 130. Cognition engine 125 may also interface with auxiliary vehicle systems 135. Auxiliary systems 135 are typically connected to the vehicle data and communication bus, and may implement, e.g., sensing and safety applications.

To perform its functions with optimal safety and efficiency, decision engine 130 requires context from its surroundings concerning the environment itself, as well as the other vehicles and moving entities in the same locality. Cognition engine 125 may provide such context to the vehicle by leveraging its sources of information. With a position and pose determined with high levels of precision by location engine 120 (e.g. via operations described hereinbelow), cognition engine 125 may filter down the 3D semantic map information within map 100 concerning the vehicle's surroundings. This provides geometry and semantic information of pseudo-static assets such as transportation infrastructure. Additionally, machine vision sensors 110 along with auxiliary systems 135 may provide context for moving objects in the vicinity of the vehicle. Cognition engine 125 combines all of these sources and, using a precise vehicle position and vehicle properties, processes and communicates the context to decision engine 130, thereby reducing the necessary cognitive load for decision making by decision engine 130.

Figure 5:
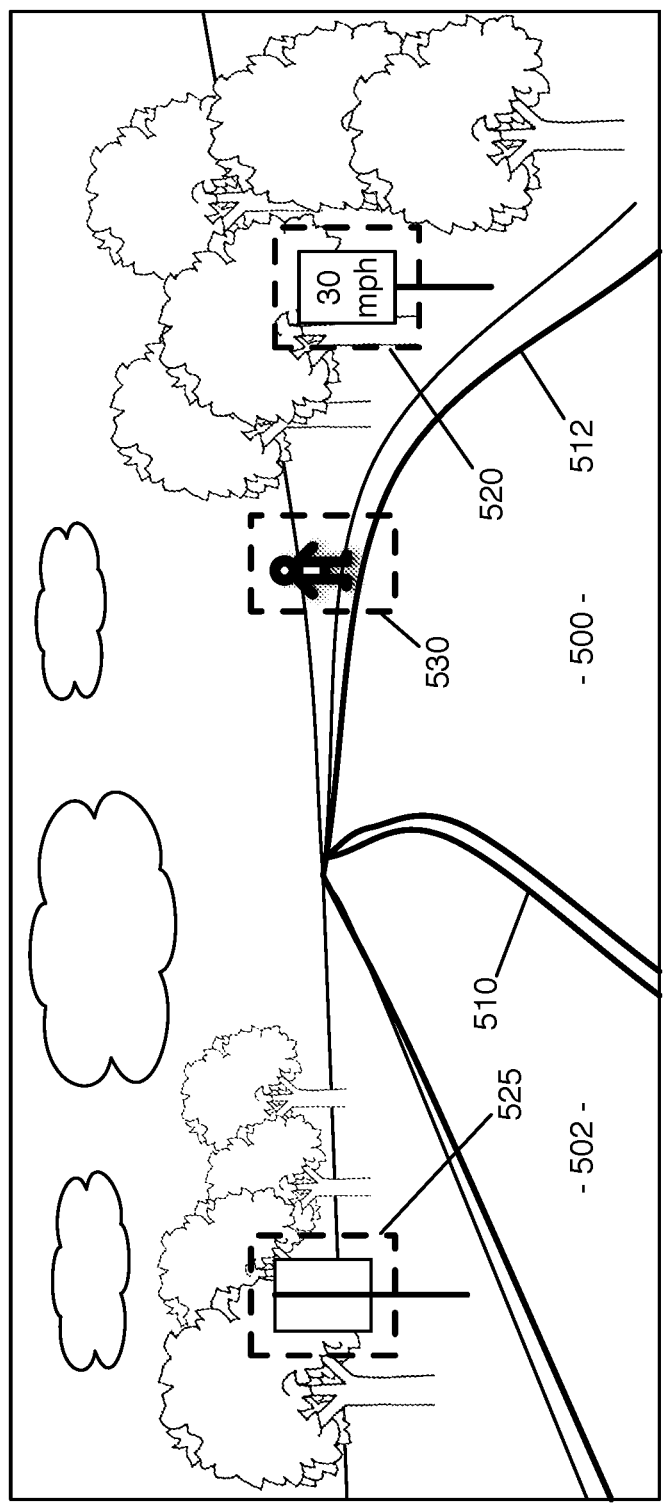
FIG. 5 is a schematic diagram of an autonomous vehicle operating environment.

FIG. 5 illustrates a context in which cognition engine 125 may be utilized to filter sensor data to reduce cognitive load incurred by decision engine 130. FIG. 5 schematically illustrates an exemplary scene during vehicle operation, as perceived by machine vision sensors 110. The vehicle is traveling along a roadway within lane 500, with the roadway also having lane 502 for travel in the opposite direction. Sensors 110 detect roadway centerline 510 and right side lane marker 512, both of which are (1) confirmed as consistent with asset semantics present within 3D semantic map 100, and (2) validated by cognition engine 125 as being pertinent to the vehicle's current operation; and therefore conveyed by cognition engine 125 to decision engine 130 for evaluation in vehicle operation. Similarly, speed limit sign 520 is also observed by machine vision sensors 110, and validated by cognition engine 125 as being pertinent to the vehicle's operation, before being conveyed to decision engine 130. In contrast, street sign 525 is observed by machine vision sensors 110, but indicated within 3D semantic map 100 as applying to vehicles traveling in an opposite direction of travel as the direction of travel identified by cognition engine 125; thus, cognition engine 125 need not pass on details concerning sign 525 to decision engine 130, thereby reducing processing load thereon. Finally, pedestrian 530 is detected by machine vision systems 110 but not indicated as a pseudo-static asset within 3D map 100, such that cognition engine 125 may convey the presence and location of a dynamic object within the field of travel, to decision engine 130.

Figure 6:
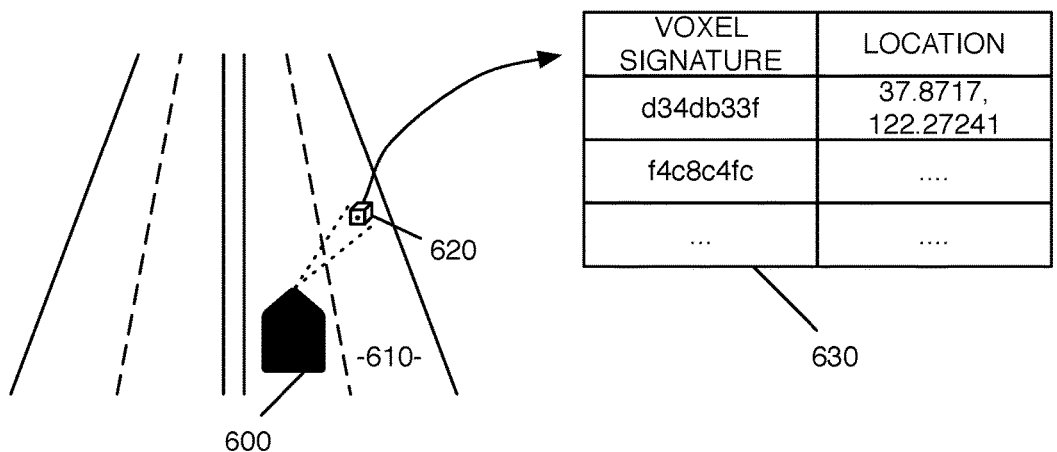
FIG. 6 is schematic block diagram of a voxel mapping system.

In order to facilitate optimal use of cognition engine 125, precise vehicle localization may be important. FIG. 6 describes the localization of robots using calculated signatures corresponding to observations performed with machine vision systems, such as machine vision sensors 110. Such machine vision systems are capable of capturing geospatial data in three dimensions. They isolate volumes in three dimensions, typically defined on a grid. Each volumetric element within the defined grid is referred to as a voxel. Voxels may vary in length, width and depth, and may not even have a shape defined in Cartesian space. Their location is typically defined as a coordinate in space, lying at the center of the voxel. While certain embodiments illustrated herein utilize voxels defined by a grid as regions of interest for purposes of analysis and localization, it is contemplated and understood that other embodiments could readily apply the same techniques to types of regions of interest other than grid-based voxels. Voxels may also be grouped in various shapes and assigned to an origin in a global frame of reference. Groupings of voxels may also be used for localizing a vehicle in a global frame. Examples of groupings of voxels may be shaped as spheres, cylinders, boxes, etc. and may have irregular shapes as well.

Techniques described herein may be used for localization of a vehicle by determining its position and its orientation. Orientation may preferably be defined in the six degrees of freedom of movement of a rigid body in three-dimensional space. That said, in some embodiments, one or more degrees of freedom may be normalized with knowledge of data properties along those degrees of freedom, thereby potentially removing the need for refining localization adjustments along those degrees of freedom.

Figure 8:
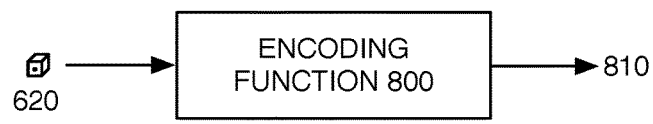
FIG. 8 is a schematic block diagram of a voxel signature derivation component.
Figure 7:
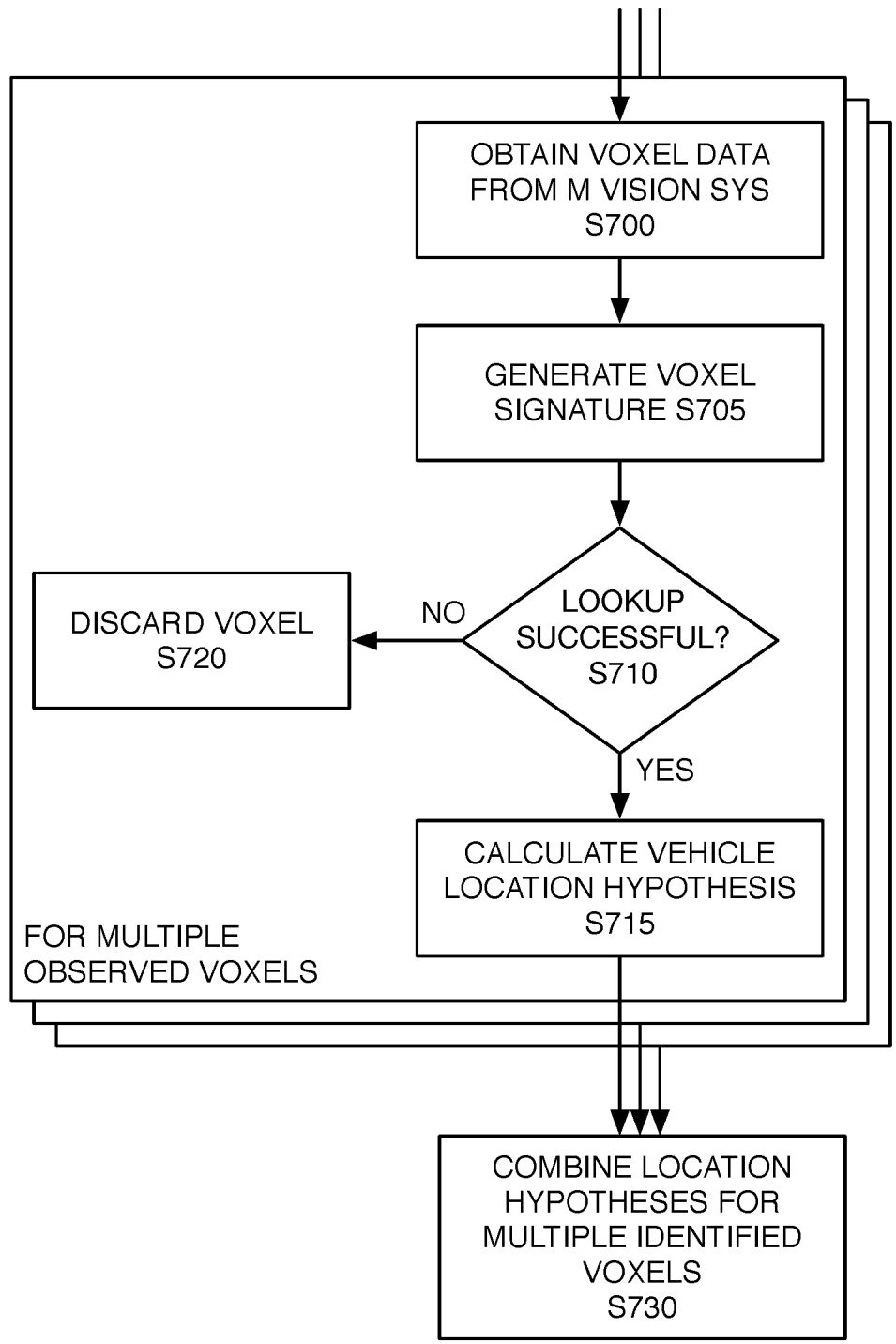
FIG. 7 is a diagram of a process for vehicle localization using a localization signature table.

In the context of FIGS. 6 and 7, vehicle 600 traveling on roadway 610 observes voxel 620 using onboard sensors (step S700). The observed data is passed into encoding function 800 (FIG. 8). Encoding function 800 is implemented via onboard computers within vehicle 600, which calculates fixed-length voxel signature output 810 using, e.g., a hashing algorithm (step S705). Voxel signature outputs actively used for localization may be stored (typically temporarily) within a query table. Each vehicle may have access to a known mapping between different signatures and the locations of the voxels which generated these signatures (localization signature table 630, storing known voxel signatures and known good locations associated with each of them, which may also be referred to as a signature reference table). With each vehicle using its machine vision sensors to measure the distance and pose of the observed voxels with respect to itself, it becomes possible to localize the vehicle in absolute terms by comparing the relative location of the vehicle to a voxel (as may be stored in a query table) with the previously-determined, absolute location of an observed voxel (as may be stored in the reference table). In other words, the vehicle's on board computation engine searches voxel signature table 630 for signature values calculated for voxels observed by the vehicle's machine vision sensor (step S710). In some embodiments of step S710, a portion or subset of voxel signature table 630 may be searched, containing voxels believed to be in proximity of the vehicle. The subset may contain voxels having positions in the reference table that are proximate the vehicle's most recent prior position estimate. The subset of locations for which matching voxels are searched may be further refined based on the vehicle's relative motion since its last position estimate, which may be determined based on, e.g., the vehicle's position, orientation and rate of travel at last estimate long with time elapsed since last estimate, and/or based on inertial measurements since last position estimate. By limiting the portion of the reference voxel signature table being matched, computational requirements may be reduced.

For each observed voxel having a signature that matches an entry in voxel signature table 630, an estimated vehicle position is determined by offsetting the distance and pose relative to the voxel observed by the machine vision system, to the known voxel location looked up from table 630 (step S715). Stated another way, an estimated vehicle position may be determined by comparing the relative position of matched voxels in a reference table with the position of the same voxels a query table (observed data). If a voxel signature lookup within signature table 630 fails, the voxel is discarded for localization purposes (step S720), although the signature matching success or failure rate may be tracked for purposes of evaluating localization effectiveness, as described further hereinbelow. By combining the estimated vehicle positions determined based on multiple matched voxel signatures (e.g. averaging, or averaging after filtering outliers), a refined determination of the vehicle's position can be determined (step S730).

A localization comparison of observed voxel signatures to stored signatures in a localization table may be done iteratively, as location engine 120 refines its position estimate. During each iteration, the position estimate of the vehicle may be modified and the match rate between the vehicle's local signatures and those present in its cached localization signature table is computed. The goal then becomes to optimize the match rate which would correspond to the most precise position and orientation estimate of the localization engine in the shared coordinate frame. In addition to match rate, the relative position of the voxels, as well as their relative position to the voxel grouping origin, may be leveraged to refine the position of the vehicle.

In some embodiments, the location and orientation of the vehicle may be defined in six dimensions: x, y, z, roll, pitch and yaw. Signature matching may then be implemented using all six of these dimensions. However, such signature matching embodiments may be computationally intensive. In compute-constrained environments, it may be beneficial to account for some dimensions using other methodologies. Methods may be employed to account for certain dimensions using parameters such as lateral distance from the roadway edge, and/or vehicle height and orientation with respect to the ground.

Figure 9:
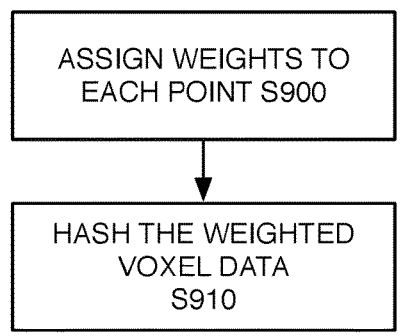
FIG. 9 is a diagram of a process for deriving a voxel signature.

The encoding function 800 isolates the observed data within the voxel and encodes it into a signature. FIG. 9 illustrates an embodiment of a process that may be implemented by encoding function 800. Function 800 assigns a weight to every point, based on the point geometry with respect to the center of the voxel (step S900). (Other embodiments may elect to assign varying weights based on factors such as the color space of data within the voxel, or the intensity associated with lidar returns.) The weights are then used to derive a signature by applying a hashing algorithm. The configuration of the hashing function along with that of the voxels can help ensure the resiliency of the encoding function to imperfections in the measurement systems (noise, different sensor configurations, changing environmental conditions, etc.). Even if different agents measure differing numbers of points in a voxel, and with some variation in distances, the output of encoding function 800 should often be the same to ensure an elevated match rate while precisely localized.

This and other signature encoding techniques can be utilized in various embodiments. Preferably, the signature encoding technique will help ensure that signatures derived from the same location in space observed from two different moments in space and time, and using different measurement systems, will often result in the same hash. That said, uniqueness of each individual signature typically does not need to be guaranteed. Rather, the signatures need only be sufficiently distinctive that they are combinatorially positioned uniquely in space. In addition to consistency within the encoding function itself, the voxel shapes and parameters, along with those of voxel groupings, may also be varied with the purposes of capturing the uniqueness of the environment, with the large amounts of information (entropy) per voxel or grouping, while retaining the resiliency to sources of noise in the sensing and environment. These common points may then be used as landmarks for e.g. navigating or registering the agent in the common coordinate system (localization), or identifying contextual information relevant to that agent or other agents utilizing these systems, such as traffic signals (semantic mapping). An ultimate objective of localization engine 120 working in tandem with a localization signature table, is to ensure the use of a common frame of reference for all agents of a swarm of agents, to ensure consistency in their observations.

Having a localization signature table on the vehicle is an important aspect of autonomous vehicle localization and navigation using the above-described techniques, yet creation of such a signature table over large navigable areas can be costly, time-consuming and resource-intensive when using a conventional fleet of survey vehicles. However, alternative techniques described below can utilize a swarm approach to creating and updating a voxel signature table.

Figure 10:
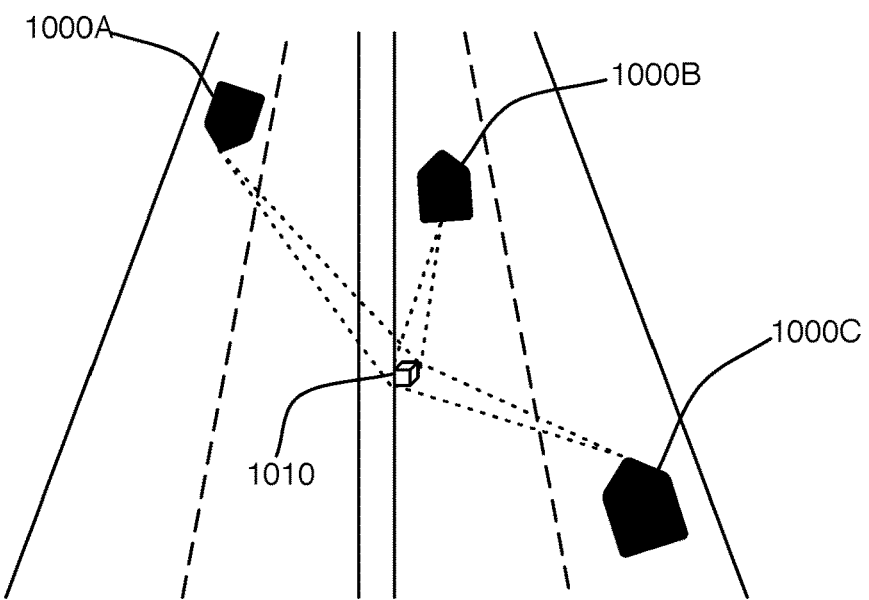
FIG. 10 is a schematic block diagram of a system for voxel mapping via agent swarm.

FIG. 10 is a schematic block diagram of an exemplary swarm approach to creating a localization signature table. In essence, a swarm of agents (e.g. vehicles 1000A, 1000B, 1000C et al. traveling in the environment, each carrying machine vision systems as described herein), traverse the same region in space, observing their local environments and recording their own location in space as they go (e.g., using a reasonably accurate localization system, such as that shown in FIG. 3). The agents 1000 each measure and hash voxels in their vicinity, such as voxel 1010, to generate voxel signatures and voxel location hypotheses for each voxel.

Figure 11:
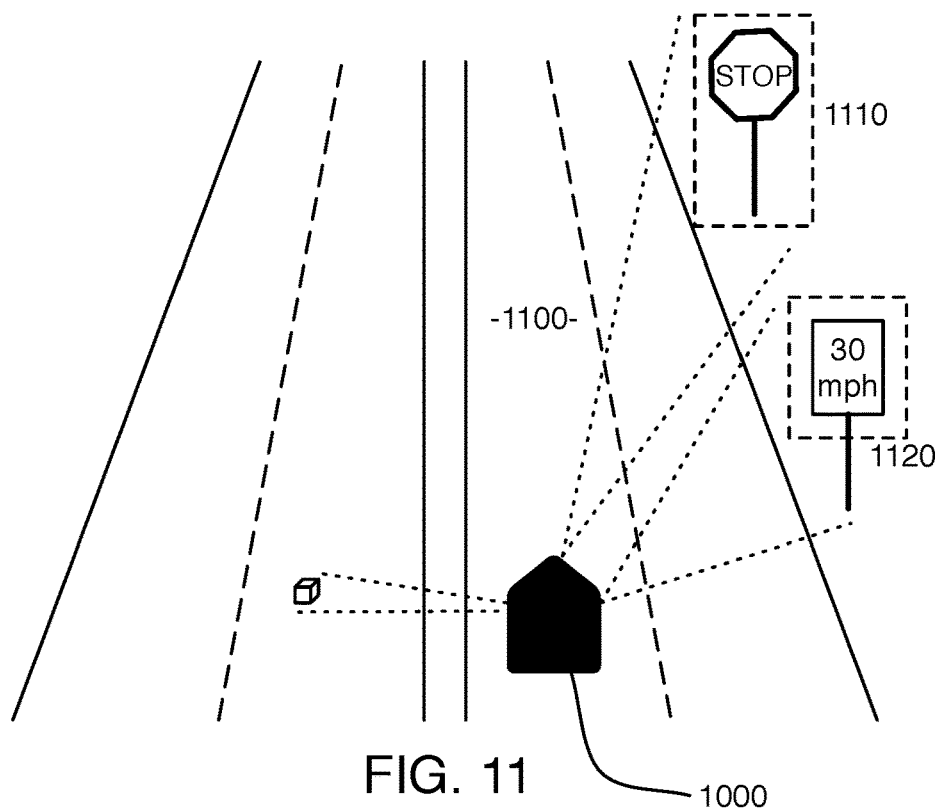
FIG. 11 is a schematic diagram of an agent sensing a local environment.
Figure 12:
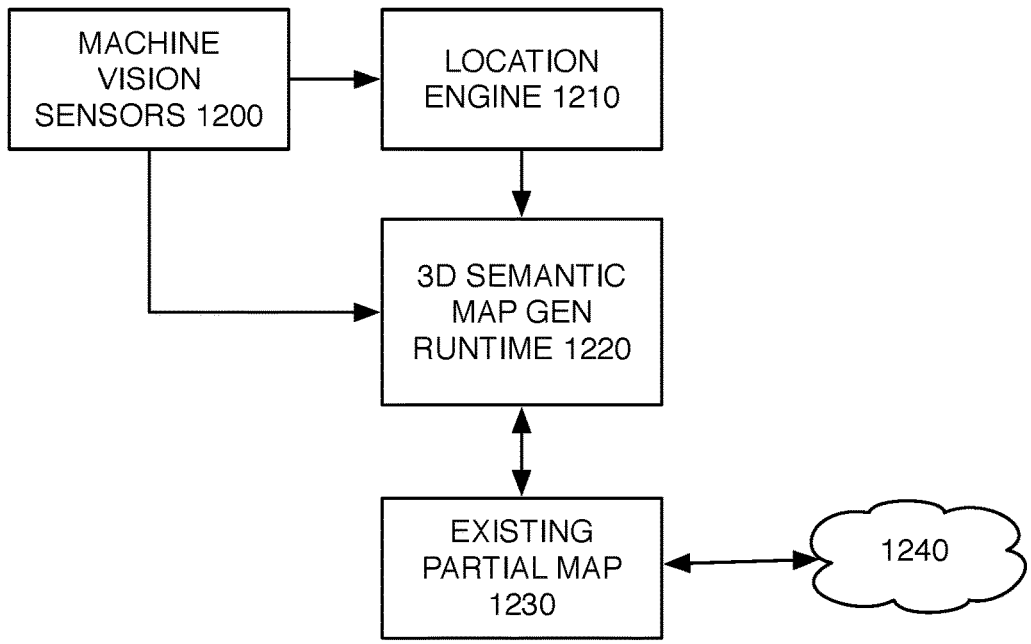
FIG. 12 is a schematic block diagram of an agent mapping system.

FIG. 11 illustrates the operation of each agent 1000 in its local environment, while FIG. 12 is a schematic block diagram of certain systems within agent 1000. Agent 1000 travels through environment 1100, carrying machine vision sensors 1200, localization engine 1210, 3D semantic map generation runtime 1220 and partial existing map 1230. Software implemented components of FIG. 12 are preferably implemented using on-vehicle computers. Machine vision sensors 1200 on agent 1000 observe assets in the local environment 1100, such as stop sign 1110 and speed limit sign 1120, and evaluate the position of the vehicle relative to those assets (e.g. using LIDAR ranging). By offsetting agent 1000's current location (provided by location engine 1210) by the position of an observed asset or voxel relative to agent 1000 (e.g. provided by machine vision sensors 1200), agent 1000 can develop a hypothesis concerning the absolute geospatial position of an observed voxel. These measurements of observed voxel location are stored by each vehicle, where a localization signature table is effectively created within on board data storage. Data may then be offloaded for further processing, as described below, such as via a wide area network data connection accessible during vehicle operation and/or by a local data connection accessed by physically transporting on vehicle storage containing partial map 1230 to a data center for offloading.

For example, in the example of FIG. 10, each of agents 1000A, 1000B and 1000C may observe a common voxel 1010 using their onboard sensors. A hypothesis concerning the location of voxel 1010 is determined relative to the vehicle's understanding of its current position. However, each vehicle 1000 carries some error with its location measurement, which comes from inaccuracies in their onboard localization systems (e.g. their GNSS measurement error coupled with noise and drift in the IMU). This error factor may be particularly significant in swarms containing vehicles with general-purpose sensing and localization equipment (e.g. consumer grade equipment as opposed to higher-cost, higher-accuracy surveying equipment). The result is that each voxel's location hypothesis will reflect the observing agents' onboard localization system instantaneous error when the voxel was captured. Considering that the error experienced varies in each vehicle, and during different trips, the resulting localization signature tables will be different.

Figure 13:
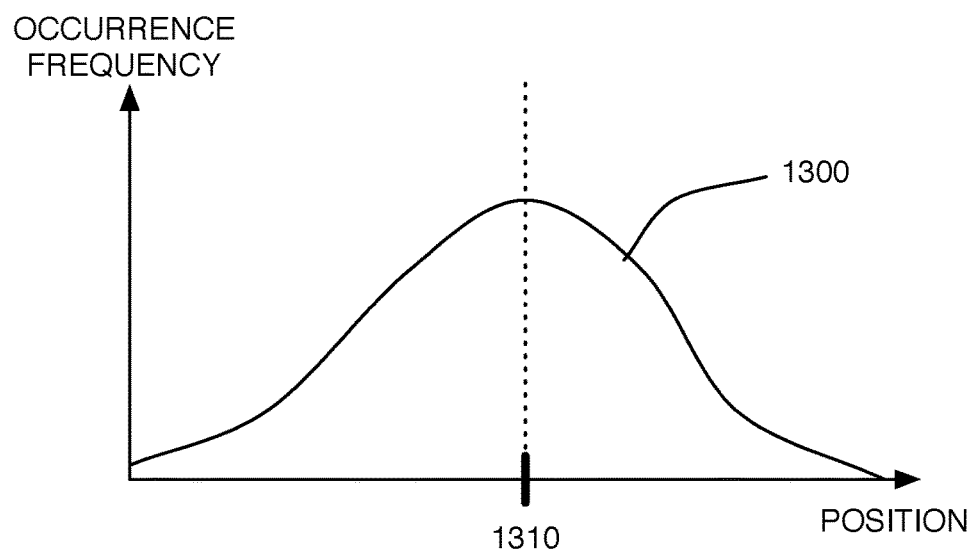
FIG. 13 is an exemplary graph of aggregate voxel position data.

The errors experienced in these localization systems can be modeled as statistical processes, allowing derivation of the best estimate of the real location of a voxel given sufficient observations. FIG. 13 is a representative graph of voxel position (illustrated on the x-axis), with the frequency at which the voxel is observed at that location illustrated on the y-axis. As numerous vehicles observe a given voxel, a distribution of position determinations may be developed. Statistical processing of the limited-precision position data 1300 from multiple vehicles may be used to characterize the data and derive a more precise location estimate 1310 for the observed voxel. For example, in some embodiments, position data 1300 can be filtered (e.g. to exclude outlier data), with remaining data points averaged, in order to derive refined location estimate 1310. This method may be effective in achieving higher rates of georeferenced accuracy. It is contemplated and understood that other mechanisms for deriving refined location estimate 1310 from position hypothesis data 1300 could also be utilized, and may instead be optimized for other factors such as relative precision. In such cases, relative fit and loop closure methods may be employed to achieve data consistency from intersecting trajectories.

Signatures linked to discrete spatial locations may also be associated with an observation time. If a signature generated for a given location is observed to have changed from its original value, this information may provide additional value to the semantic mapping system. Furthermore, changes in a location's signature over time may be reflected in the signature table to improve localization performance. Statistical methods operating in the time domain may be used to determine when a change observed in a location's signature code should be considered significant and therefore used to update the informational content of the semantic map or localization system.

Assuming a precise localization of each vehicle is achieved after sufficient vehicle arrivals have captured the environment, the swarm can then map the local environment around each member of the swarm. Agent machine vision sensors 1200 drive inputs to location engines 1210 to yield a precise position and pose for each vehicle, and feed into a 3D semantic map creation runtime 1220. Using the data captured by agent sensors, the map creation runtime 1220 analyzes its environment in search for assets. Examples of analyzing environmental sensing data for asset identification are described in, e.g., Applicant's co-pending U.S. patent application Ser. No. 15/002,380, filed Jan. 20, 2016 and incorporated herein by reference. The resulting vectors (assigned to precise positions and geometries) and semantics are then matched with the existing local copy of the 3D semantic map present on the vehicle. Updates to the existing map are periodically synchronized with a common cloud backend system 1240, responsible for the aggregation of the data and broadcasting of map updates to multiple agents. Such updates can be transmitted to cloud backend system 1240, preferably via a cellular data modem (not shown) integrated within the agent vehicles to enable communications via the Internet between cloud backend system 1240 and one or more of systems 1200, 1210, 1220 or 1230. In other embodiments, alternative means of delivering map updates to cloud backend 1240 may be utilized, such as transmission over a local area 802.11 wifi connection when the agent is in proximity of a wifi access point, and/or uploading of data when the agent returns to a data offloading center.

Figure 14:
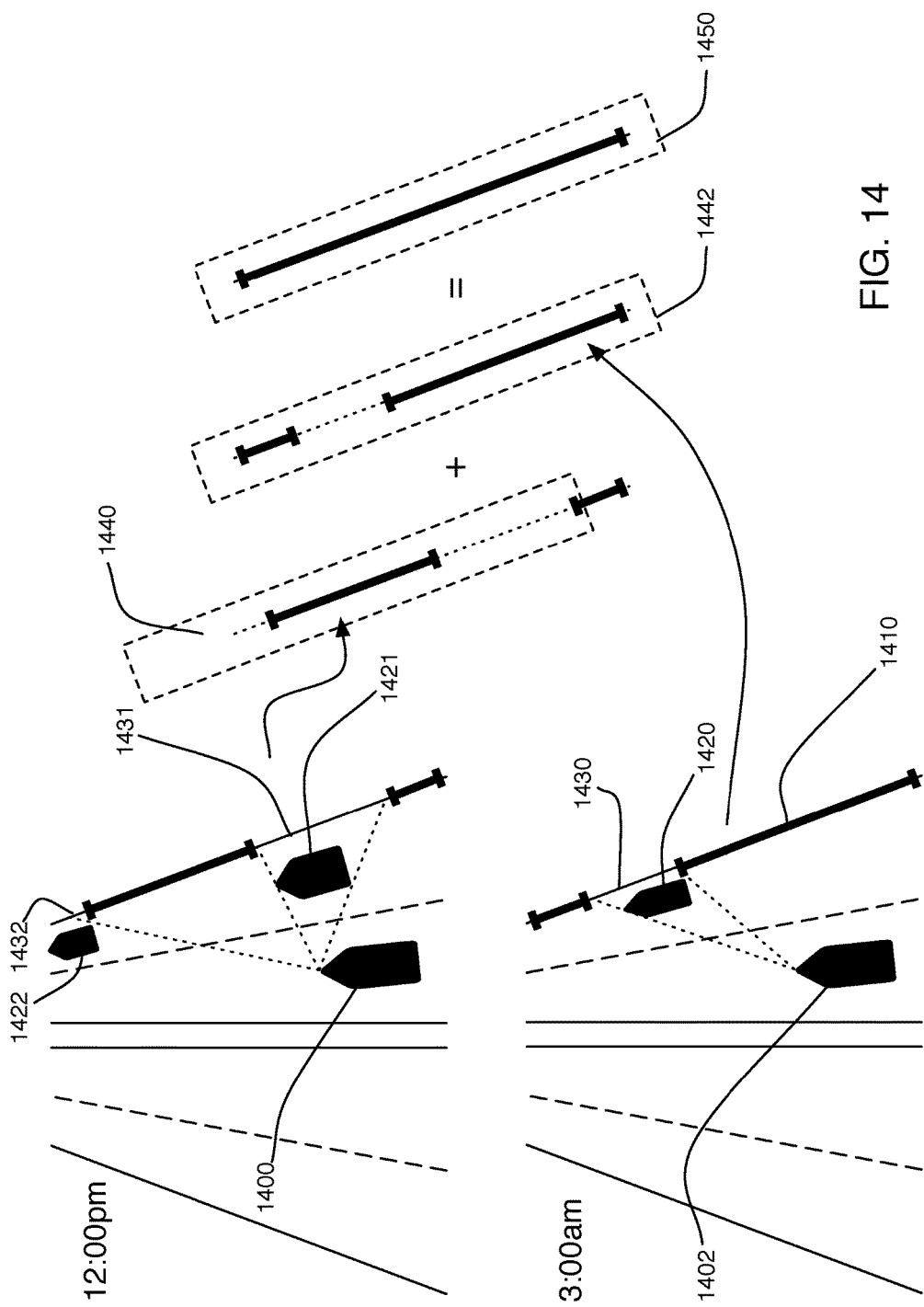
FIG. 14 is a schematic diagram of swarm-based aggregate feature mapping.

FIG. 14 shows an example of data aggregation at the backend cloud system 1240. Two swarm agents 1400 and 1402 visit the same area during different trips (agent 1400 at 12:00 pm and agent 1402 at 3:00 am). The two agents 1400 and 1402 are localized precisely to the localization signature table, as described hereinabove, and are currently mapping the curb line 1410 to the right of their direction of travel (e.g. characterizing the asset's nature and determining the asset's geospatial position). In both cases, certain parked cars 1420, 1421 and 1422 obstruct portions of the machine vision sensor path, thereby shadowing parts 1430, 1431 and 1432 of the curb line. The result is an imperfect mapping of the curb line stored by each agent (i.e. mapping 1440 from agent 1400 and mapping 1442 from agent 1402). Both agents relay their derived curb lines to a common cloud backend 1240, such as via on-board cellular Internet connections. Cloud backend 1240 can combine mappings 1440 and 1442 to yield a more complete, server side mapping 1450 of curbline 1410 (potentially including other observations from previous trips by the same or other agents). This more complete server side version 1450 of the curbline can then be broadcast to all swarm agents, so that each vehicle receives the benefit of the improved map.

Swarm agents can also be utilized to derive semantic associations between the various assets on the map. These semantic associations are useful for the vehicle's decision engine to operate in the environment. The extraction of semantic meanings from the assets may be done in a rule-based, or behavior-based fashion, or a combination. With rule-based extraction, the mapping engine utilizes a pre-programmed set of traffic rules and associated interpretations, using physical infrastructure. This can help anticipate a particular semantic association. With behavior-based extraction, the vehicle may observe the movements of agents in its vicinity (as well as the vehicle's own behavior, when navigated manually by a driver rather than autonomously) to derive a semantic association for an asset.

Figure 15:
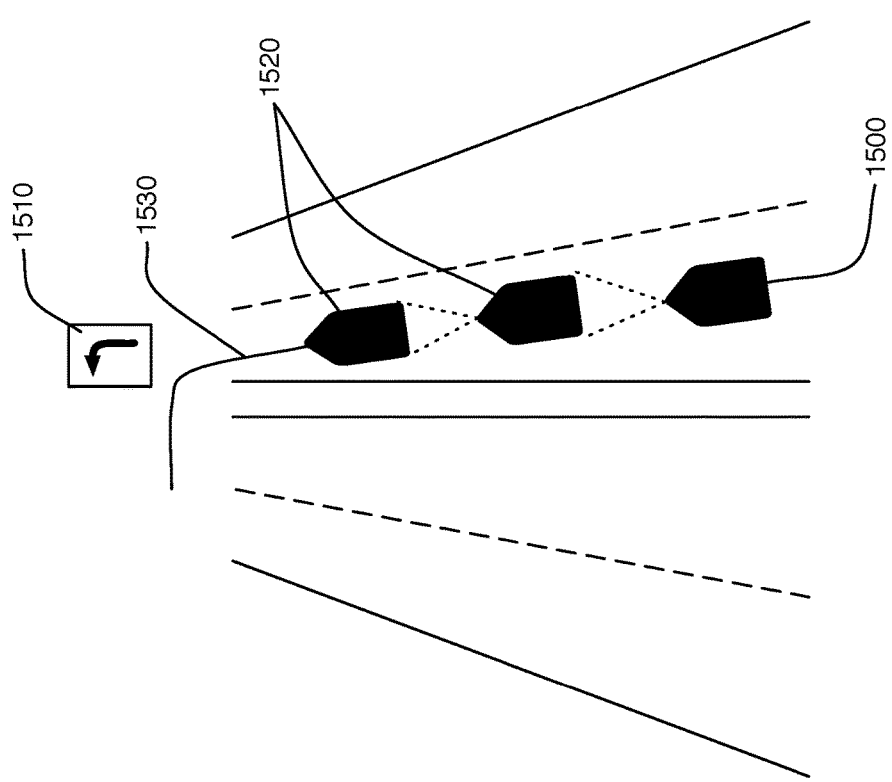
FIG. 15 is process diagram of swarm agent runtime operations.

For example, FIG. 15 illustrates a swarm agent 1500 present in a left-turn only lane. This agent 1500 has already perceived the sign 1510 providing a visual indication of the nature of the lane. The agent is able to classify the sign and derive its meaning via a rules-based semantic extraction (e.g., perception of sign having a certain appearance, positioned over a lefthand traffic lane, being indicative of a left turn only lane). Additionally, by observing the other vehicles 1520 in the lane ahead, the agent is able to associate their turning trajectories 1530 with the same sign semantic in a behavior-based semantic extraction, thereby increasing the confidence level of agent 1500 in the semantic meaning of sign 1510 as designating a turn lane.

Figure 16:
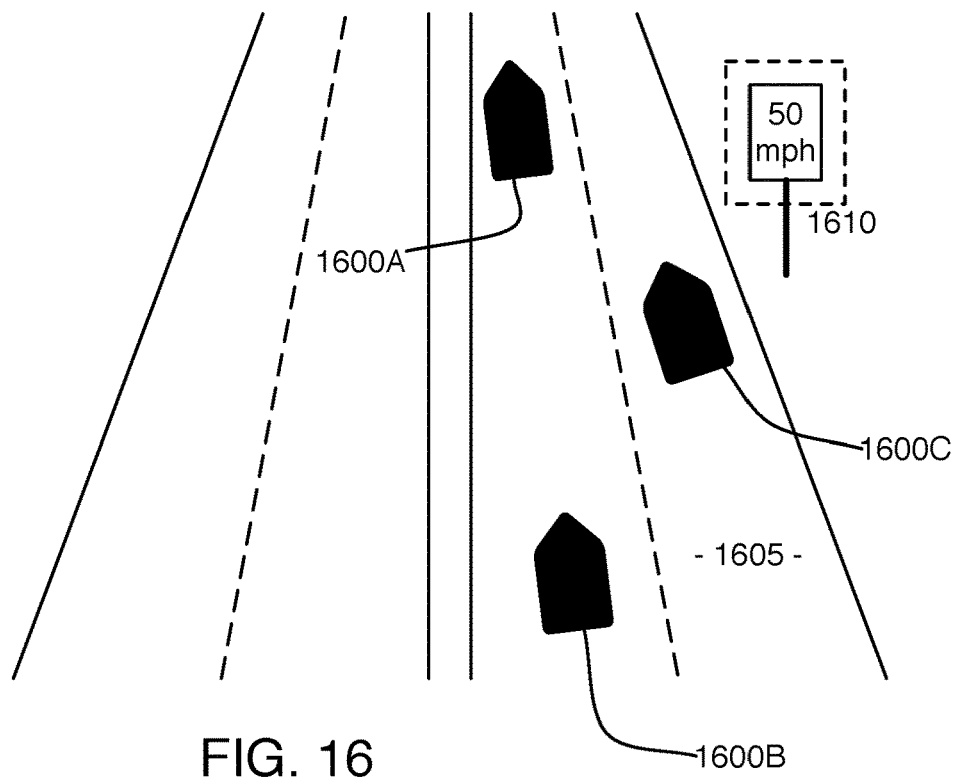
FIG. 16 is a schematic diagram of swarm-based runtime operations.
Figure 17:
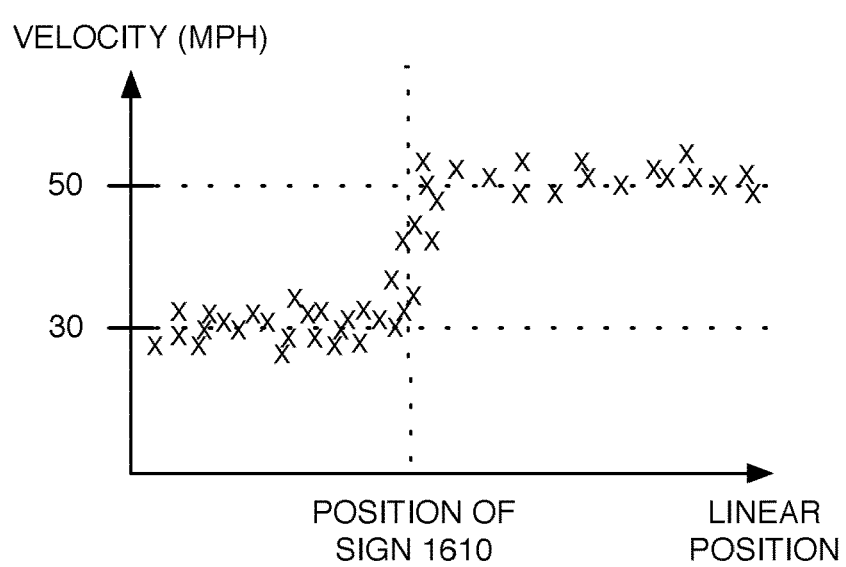
FIG. 17 is a graph of server-side agent monitoring for behavior-based semantic extraction.

FIGS. 16 and 17 illustrate how the semantic meaning of a particular asset can be validated or reinforced on the server side. FIG. 16 is a schematic illustration of multiple vehicle agents 1600 traveling along roadway 1605, past roadway speed limit sign 1610 which operates to change a roadway speed limit from 30 miles per hour to 50 miles per hour. Though the agents 1600 may be capable of interpreting the speed limit reading of speed limit sign 1610 (e.g. via rules-based semantic extraction), a central server software application, such as may be implemented on cloud server 1240, may be tracking the velocity of various agents 1600 in a particular lane (e.g. by periodically obtaining reports of vehicle speed directly, such as via reporting by auxiliary vehicle systems 135, or by tracking a rate of change in vehicle location), for many different arrivals over time, along with other inertial and raw or processed sensor data. FIG. 17 illustrates such exemplary vehicle speed data, with agent velocities plotted against linear position along roadway 1605. By correlating the location of the sign 1610 with the change in average speed of the agents 1600, the semantic meaning can be reinforced via server-side behavior-based semantic extraction. It is understood that vehicles on a road might not always abide by the speed restrictions. The information collected by the system may still be useful for the purposes of semantic mapping, nevertheless.

The patterns observed both on the swarm agents and at the server systems can also be categorized and applied in similar scenarios. This can be done both with mapping the asset location and features, as well as deriving the semantics between the assets. For instance, the pattern relating the left-turn sign with the particular left-turn lane, can be applied in a similar scenario, where a similar sign and lane occur at a different intersection. Machine learning techniques similar to the ones applied in, e.g., Applicant's co-pending U.S. patent application Ser. No. 15/002,380, filed Jan. 20, 2016, can be adopted in studying the mapping and semantic patterns.

Figure 18:
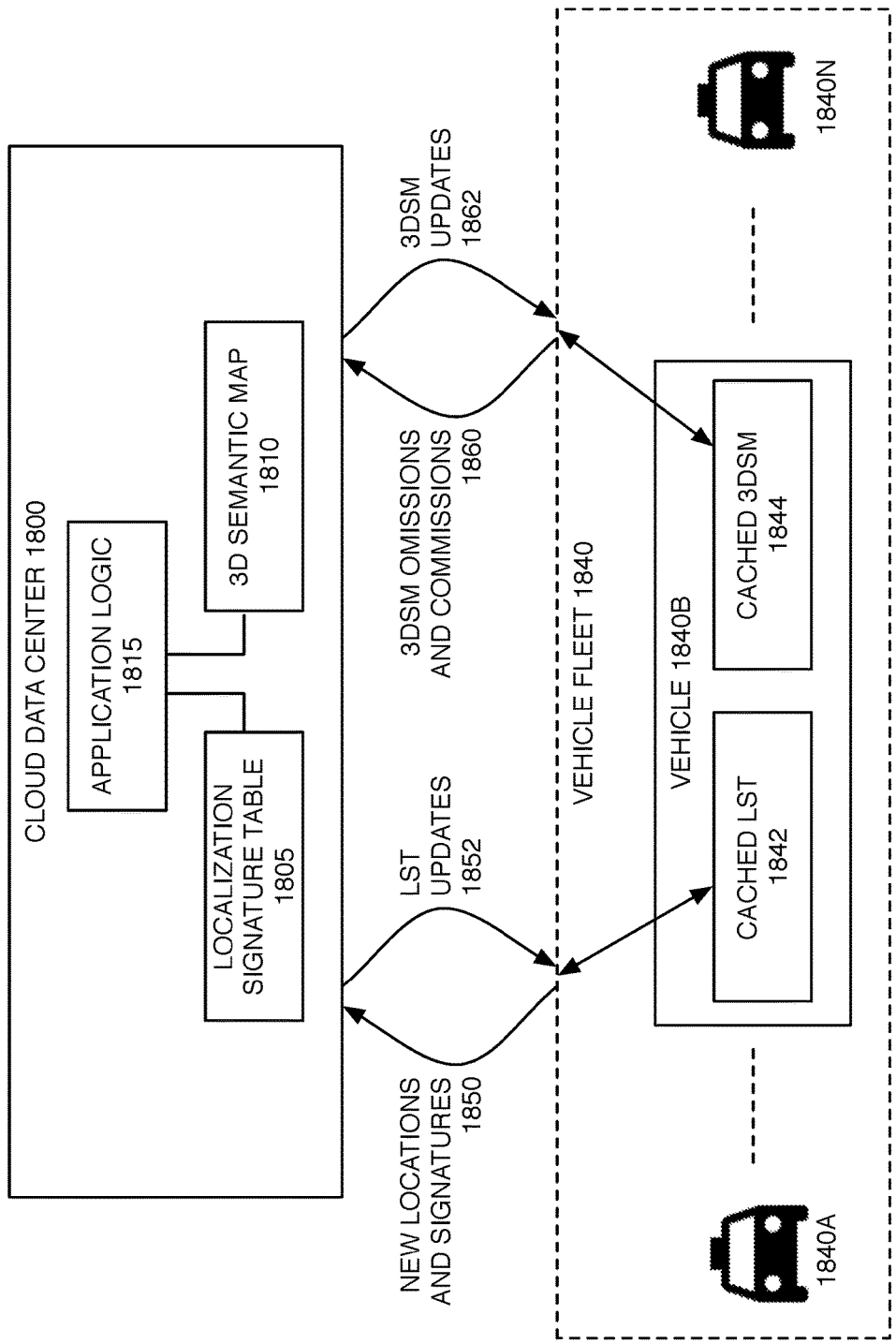
FIG. 18 is a schematic block diagram of a swarm and cloud server for mapping a geographic area.

FIG. 18 shows an embodiment of a system architecture that may be used for the swarm-based localization and mapping. Swarm agents 1840 interact with a cloud backend system 1800 as they travel through the environment. New signatures derived by agents from voxels and their location estimates, 1850, are communicated to the cloud servers 1800. Servers 1800 implement application logic 1815 to aggregate these measurements as different observations and derive the best estimate of the location of each signature within the environment. The signatures are stored in master localization signature table (LST) 1805. Once a voxel is localized with sufficient precision, it can be communicated from cloud server 1800 to swarm agents 1840 via LST updates 1852. Agents 1840 can then utilize that voxel location information to update their locally-cached LST 1842 and to refine their position in real time. This process ensures that swarm agents share the same coordinate system.

Concurrently, precisely localized agents 1840 map their surroundings, detecting asset omissions as well as commissions to their locally cached 3D semantic map (3DSM) 1844, and uploading those omissions and commissions 1860 to cloud data center 1800. The cloud data center servers, and associated application logic 1815, receive these updates remotely and aggregate the 3DSM data from different vehicles. Since each asset detection algorithm suffers from a varying level of confidence, certain errors will be committed on an individual asset identification basis. However, as the number of trips visiting the same area grows, so does the confidence in the observed hypotheses that is derived from the aggregate reported information. Examples of sequential analysis of semantic map data is described in, e.g., Applicant's co-pending U.S. patent application Ser. No. 15/002,380, filed Jan. 20, 2016 and incorporated herein by reference. Ultimately, servers 1800 maintain the most up-to-date version of a master 3D semantic map 1810, and periodically communicate the validated changes 1862 to the rest of the swarm agents 1840.

Figure 19:
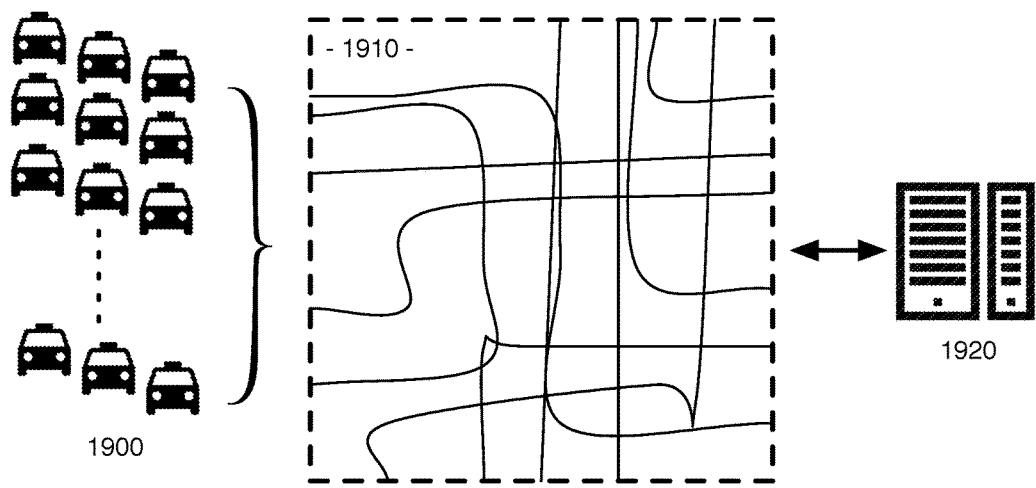
FIG. 19 is a schematic diagram of a swarm-based approach to mapping a geographic area.

FIG. 19 illustrates a swarm-based approach to mapping a geographic area 1910, as contrasted with the conventional survey fleet approach of FIG. 2. In particular, a large swarm 1900 is empowered to create the 3D semantic maps. The refresh rate of the map is also much higher, given that the swarm agents 1900 regularly and repeatedly visit areas. In general, locations in space which see many changes over time are often heavily visited by the robotic swarm. In addition, the routes taken by the swarm agents 1900 need not be pre-planned, since the sheer number of vehicles ensures that each area is visited sufficiently. The swarm agents 1900 carry a variety of machine vision sensors (of different grades) and a variety of GNSS and IMU models (of varying grades as well). The detection processes on those agents are then varying as well. In some embodiments, tasks can be distributed to different agents to perform various roles in creating, processing, and updating maps. Individual tasks can be given to agents based on factors that make them best suited for the role such as hardware configuration (e.g. processors, memory, sensors), geographic location, or historical trust and quality metrics (e.g. a particular agent configuration may be known to collect survey data well-suited to identification of certain assets or semantics, such as lane markings, while another is better at sign identification).

Tracking performance metrics of agent configurations over time allows for knowledge of the agents best suited to a task to be continuously updated as both needs and configurations change.

Known agents can be tracked via a client-server model, where agents announce to a job server with cloud infrastructure 1920, which then gives the agent a task from a job queue based on factors such as task priority, hardware requirements, agent location, and known performance history of similar agents. Since the swarm agents do not need to transmit the raw sensor data, but rather the heavily compressed location signatures and 3D vectors and semantics with the cloud backend, the problem of moving large amounts of sensor data disappears. In essence, the computation takes place to the largest possible extent on the agents' onboard computational resources, with the backend servers 1920 responsible for aggregating and validating the data, and sending updates to the agents. This enables an automated and a scalable method for up-to-date 3D semantic map creation.

When visiting new areas, a swarm is unable to immediately begin mapping the areas' assets and semantics. The localization signature table for those areas needs to be built in order for swarm agents to precisely position themselves. Only when this is achieved can the agents start reliably mapping these areas.

While the swarm approaches to localization and mapping may be effectively implemented for a large number of vehicles, the same approach may be successfully utilized with even a single vehicle traversing an area at different times. Variation inherent in a vehicle's equipment will typically result in slightly different data each time an area is traversed, even if the area itself has not changed. Localization tables and semantic mapping may be improved over time by combining observations from multiple different trips, even if from a single agent.

Figure 20:
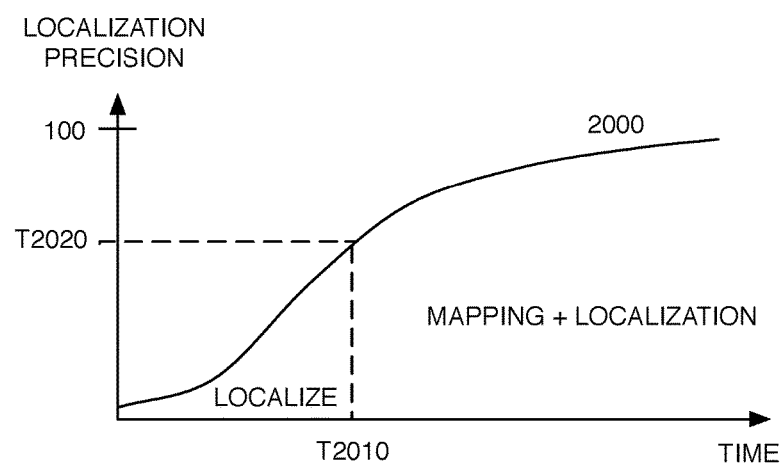
FIG. 20 is a graph illustrating localization and mapping operations based on vehicle localization precision.

FIG. 20 illustrates an exemplary relationship between agent localization and agent activity, with plot 2000 showing an exemplary agent's level of localization precision over time. Prior to time T2010, the agent's level of localization precision remains below a threshold level T2020; therefore, the agent's onboard activity is focused on localization, as it seeks to build a more complete and accurate localization table for the area, as described above. Once the level of localization precision for the agent increases beyond threshold T2020, the agent adds mapping activity, preferably simultaneously with continued building of a localization signature table. Localization precision can be determined, e.g., by an agent tracking the number or proportion of successfully matched signatures over time (i.e. the number of matches between the agent's observed signatures, and signatures present in cached LST 1142). The localization engine running on a vehicle may implement different modalities, based on the frequency of matching to voxels or groupings of voxels, over a space-time interval. In an exemplary embodiment, one mode may be activated when an area has not been visited previously, another mode may be used when an area has a partial signature table which is not sufficient to localize consistently, and a third mode may be applied when enough signatures and groupings thereof exist in the table and the vehicle is able to consistently correct its trajectory. Transitioning between modalities may depend on the consistency in the signature matchings between observed voxels in the vicinity of the vehicle and those present in the local signature reference table. These different modalities may affect how information from the agent is received at the cloud application server 1800. Thus, contributions to master localization signature table 1805 or master 3D semantic map 1810 may be given greater or lesser levels of trust, based upon (amongst other things) the localization mode in which those contributions were generated at the vehicle end.

Figure 21:
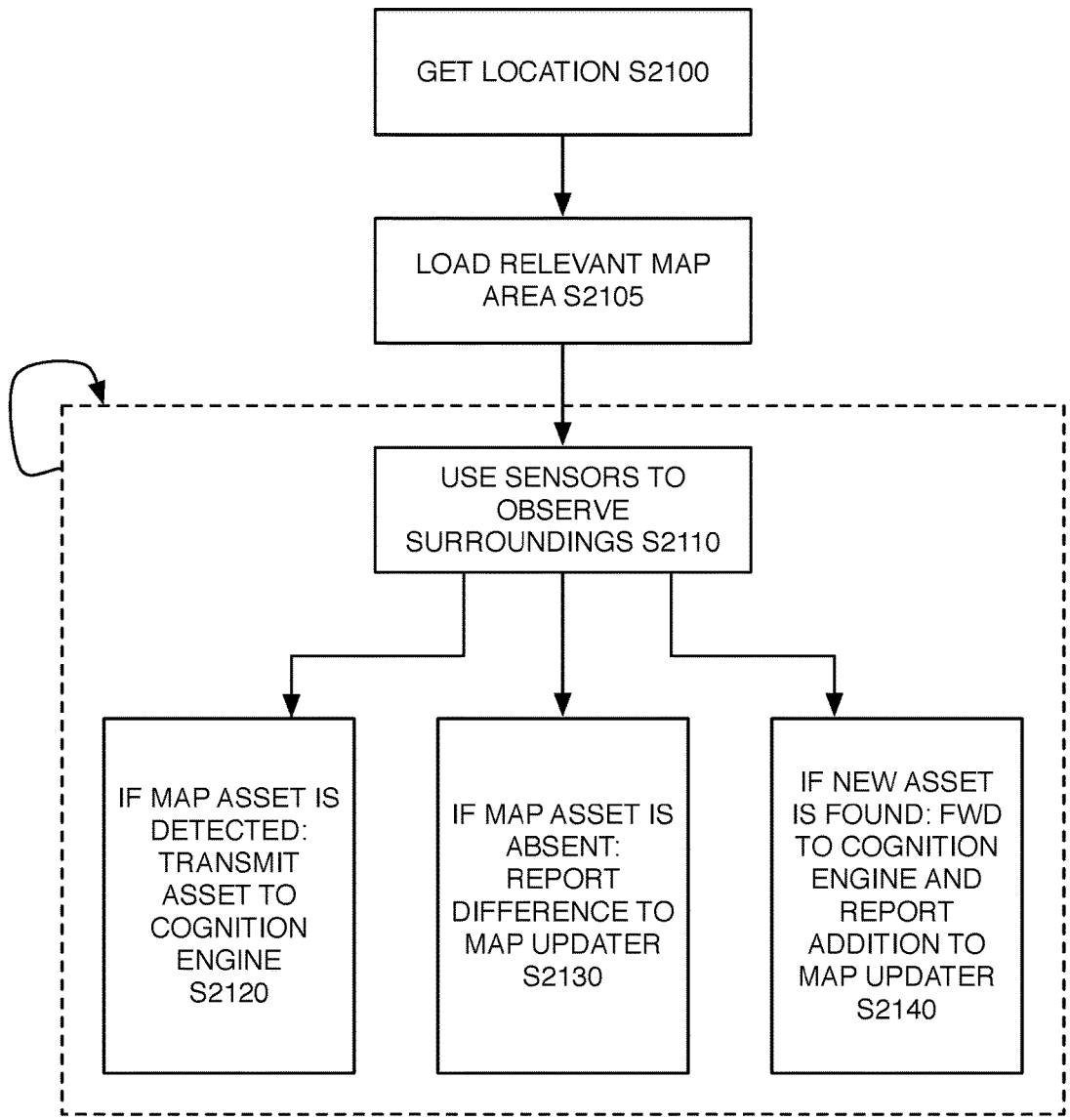
FIG. 21 is a process diagram for creation and auditing of map assets during vehicle operation.

FIG. 21 illustrates a typical system operation for map creation and auditing, and its interface with a vehicle's cognition and decision engines in the framework presented here. Using its various sensors, and the localization signature table, the vehicle obtains a precise location (step S2100). Based on this location and desired destination of the vehicle, the relevant 3D semantic map data is loaded from the locally cached map (step S2105). As the vehicle progresses through the environment, it uses its sensors to observe its surroundings (step S2110). Three cases arise:

a. when assets present in the map are detected in the environment, they are forwarded to cognition engine 125 which uses them to extract context from the vehicle's surrounding, and transmits that context to decision engine 130 (step S2120).

b. when the assets present in the map are not detected in the environment, the map updater is notified of these omissions (step S2130). The map updater is a local application module responsible for communicating the map differences with the cloud servers.

c. when assets which are not present in the map are detected in the environment, they are forwarded to the vehicle's local cognition engine 125 and added to the list of commissions of the map updater (step S2140).

The machine vision system presented in some embodiments disclosed herein may also communicate with other on-board systems (i.e. auxiliary systems 135), such as autonomy systems and driving assistance systems. The exchange of information between these systems can augment the localization signature generation as well as the 3D semantic mapping and auditing, thereby potentially increasing asset detection accuracy and/or removing artifacts from the machine vision data. Such integrations may involve the vehicle's data bus (e.g. CAN bus in a car, or MVB in a train). Information such as the vehicle's steering angle, braking/throttle, velocity, etc. may be utilized to account for noisy sources of sensor data within the inertial systems and the machine vision systems. In an exemplary implementation of the specification, the localization and mapping engines can leverage the output of the driving assistance systems on the vehicle. Such systems may be able to detect dynamic objects near the vehicle (e.g. other vehicles, or cyclists). Since these objects can create shadows in the machine vision data, preventing the vehicle from observing what lies beyond them, the raw sensor data from those sections can therefore be removed.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A method of creating a vehicle localization table used by a vehicle in determining the absolute geospatial position of the vehicle via reference to the local environment of the vehicle, the method comprising:
   engaging in multiple traversals of a local environment, by one or more vehicles, each vehicle having an on board machine vision sensor and an on board computer;
   observing, during each traversal by a vehicle, each of a plurality of voxels, in order to generate for each of said voxels a voxel signature and an associated voxel location hypothesis, both of which are stored locally within a localization table and utilized by the vehicle for determining the vehicle's absolute geospatial position;
   aggregating localization tables from said traversals;
   for each observed voxel, determining a refined voxel location hypothesis combinatorially based on voxel location hypotheses sharing a common voxel signature within the aggregated localization tables; and
   updating, by one or more of said vehicles, the voxel location hypothesis within the vehicle localization table, based on the refined voxel location hypothesis.

2. The method of claim 1, in which the step of aggregating localization tables comprises transmitting, by each vehicle, localization table content comprising voxel signatures and associated location hypotheses, from the vehicle to a central data processing computer via a wide area data network.

3. The method of claim 1, in which the step of observing, during each traversal, each of a plurality of voxels, further comprises the substep of storing locally, within the localization tables, a time at which each voxel was observed, along with signatures extracted for that particular voxel location.

4. The method of claim 1, in which the step of determining a refined voxel location hypothesis combinatorially comprises filtering voxel location hypotheses within the aggregated localization tables sharing a common voxel signature.

5. The method of claim 4, in which the step of determining a refined voxel location hypothesis combinatorially further comprises averaging the filtered voxel location hypotheses.

6. The method of claim 4, in which the step of determining a refined voxel location hypothesis combinatorially further comprises filtering outlier position estimates.

7. The method of claim 2, further comprising the step of: receiving, by each vehicle from the central data processing computer, an updated master localization signature table.

* * * * *